United States Patent
Billsberry et al.

(10) Patent No.: US 11,592,550 B2
(45) Date of Patent: Feb. 28, 2023

(54) LOW RANGE ALTIMETER ACTIVE LEAKAGE CANCELLATION

(71) Applicant: Rockwell Collins, Inc., Cedar Rapids, IA (US)

(72) Inventors: Mark A. Billsberry, Indialantic, FL (US); Shawn M. Mason, Satellite Beach, FL (US); David Wright, Indian Harbour Beach, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 122 days.

(21) Appl. No.: 17/039,150

(22) Filed: Sep. 30, 2020

(65) Prior Publication Data

US 2022/0099821 A1 Mar. 31, 2022

(51) Int. Cl.
*G01S 13/88* (2006.01)
*G01S 7/40* (2006.01)
*G01S 13/32* (2006.01)
*H01Q 1/52* (2006.01)

(52) U.S. Cl.
CPC .......... *G01S 13/882* (2013.01); *G01S 7/4008* (2013.01); *G01S 13/32* (2013.01); *H01Q 1/525* (2013.01)

(58) Field of Classification Search
CPC ...... G01S 13/882; G01S 7/4008; G01S 13/32; H01Q 1/525
See application file for complete search history.

(56) References Cited

U.S. PATENT DOCUMENTS

| 3,341,849 | A | 9/1967 | Cordry et al. |
| 4,806,935 | A | 2/1989 | Fosket et al. |
| 6,426,717 | B1 | 7/2002 | Maloratsky |
| 7,161,527 | B2 | 1/2007 | Vacanti |
| 7,239,266 | B2 | 7/2007 | Vacanti |
| 9,557,409 | B2 | 1/2017 | Ferguson |

(Continued)

FOREIGN PATENT DOCUMENTS

| KR | 20180110269 A | 10/2018 |
| KR | 20180110269 A * | 10/2019 |

OTHER PUBLICATIONS

K. Lin and Y. E. Wang, "Real-time DSP for reflected power cancellation in FMCW radars," IEEE 60th Vehicular Technology Conference, 2004. VTC2004-Fall. 2004, 2004, pp. 3905-3907 Vol. 6, doi: 10.1109/VETECF.2004.1404809. (Year: 2004).*

(Continued)

*Primary Examiner* — Peter M Bythrow
*Assistant Examiner* — Nazra Nur Waheed
(74) *Attorney, Agent, or Firm* — Suiter Swantz pc llo

(57) ABSTRACT

A low range altimeter (LRA) may include a transmitter, a receiver, at least one antenna, an active leakage cancellation circuit, and a microcontroller unit (MCU). The transmitter may be configured to transmit a first signal (or transmitted signal) via the at least one antenna. The receiver may be configured to receive a second signal (or received signal) via the at least one antenna. The active leakage cancellation circuit may be configured to receive a portion of the transmitted signal from the transmitter, and may be configured to inject the portion of the transmitted signal into the receiver after an adjustment of the portion of the transmitted signal to reduce leakage observed in the received signal. The MCU may be coupled to the transmitter and the receiver, and may be configured to adjust the portion of the portion of the transmitted signal.

9 Claims, 10 Drawing Sheets

(56) References Cited

U.S. PATENT DOCUMENTS

| | | |
|---|---|---|
| 9,678,197 B2 | 6/2017 | Vacanti |
| 10,018,716 B2 | 7/2018 | Ferguson et al. |
| 10,557,934 B1 | 2/2020 | Billsberry et al. |
| 2009/0096663 A1 | 4/2009 | Thomas et al. |
| 2015/0378017 A1 | 12/2015 | Ferguson et al. |
| 2018/0113193 A1* | 4/2018 | Huemer ............... G01S 7/2813 |
| 2020/0186186 A1* | 6/2020 | Savary .................. G01S 7/038 |
| 2020/0249339 A1* | 8/2020 | Li ......................... G01S 13/325 |
| 2020/0264272 A1* | 8/2020 | Visweswaran ............ G01S 7/35 |

OTHER PUBLICATIONS

Beasley PDL et al: "Solving the problems of a single antenna frequency modulated CW radar", May 7, 1990; May 7, 1990-May 10, 1990, May 7, 1990 (May 7, 1990), pp. 391-395, XP010007512.
Extended Search Report in European Application No. 21199823.2 dated Feb. 28, 2022, 8 pages.
Kaihui Lin et al: "Real-time dsp for reflected power cancellation in FMCW radars", 2004 IEEE 60th Vehicular Technology Conference. VTC2004-FALL (IEEE Cat. 0.04CH37575) IEEE Piscataway, NJ, USA, IEEE, vol. 6, Sep. 26, 2004 (Sep. 26, 2004), pp. 3905-3907, XP010790152, Doi: 10.1109/Vetecf.2004.1404809 ISBN: 978-0-7803-8521-4.
Zhang Feng et al.: "A Study of Cancelling the Leakage Signal With a RPC for Single Antenna LFMCW Radar Altimeter" In: "Microelectronics, Electromagnetics and Telecommunications : Proceedings of ICMEET 2017", Jan. 1, 2012 (Jan. 1, 2012), Springer Netherlands, NL, XP55893509, ISSN: 1876-1100 ISBN: 978-94-017-8798-7 vol. 135, pp. 127-135, DOI: 10.1007/978-1-4614-2185-6_16.

\* cited by examiner

LOW RANGE ALTIMETER ACTIVE LEAKAGE CANCELLATION

BACKGROUND

A low range altimeter (LRA) may be susceptible to leakage, which results in interference. The LRA may be non-integrated, including multiple antennas that are physically separated to address the leakage through isolation. The LRA may be integrated, including dual integrated antennas for the transmitters and receivers, respectively, that are physically separated to address the leakage through isolation. The LRA may be integrated, including a single antenna for both the transmitters and receivers that may require a duplexer solution for the leakage, due to being unable to be physically separated. Known integrated LRAs may not include antennas that are sufficiently physically separated to provide a necessary or desired level of isolation addressing the leakage, leading to issues caused by leakage being more severe in an integrated LRA due to the reduced physical separation.

SUMMARY

A low range altimeter (LRA) is disclosed, in accordance with one or more embodiments of the disclosure. The LRA may include a transmitter. The LRA may include a receiver. The LRA may include at least one antenna. The transmitter may be configured to transmit a first signal via the at least one antenna. The receiver may be configured to receive a second signal via the at least one antenna. The first signal may be a transmitted signal and the second signal may be a received signal. The LRA may include an active leakage cancellation circuit. The active leakage cancellation circuit may be configured to receive a portion of the transmitted signal from the transmitter. The active leakage cancellation circuit may be configured to inject the portion of the transmitted signal into the receiver after an adjustment of the portion of the transmitted signal to reduce leakage observed in the received signal received via the at least one antenna. The LRA may include a microcontroller unit (MCU). The MCU may be configured to adjust the portion of the transmitted signal.

In some embodiments, the at least one antenna may include a transmitting (TX) antenna coupled to the transmitter. The at least one antenna may include a receiving (RX) antenna coupled to the receiver. The leakage may be observed from the transmitting antenna by the receiving antenna.

In some embodiments, the at least one antenna may include a combination transmitting and receiving (TX/RX) antenna coupled to the transmitter and the receiver.

In some embodiments, further including a radio frequency (RF) circulator-based duplexer positioned between the transmitter, the receiver, and the combination (TX/RX) antenna. The leakage may be observed through the RF circulator-based duplexer in addition to the received second signal.

In some embodiments, the transmitter may include a power amplifier (PA). The portion of the transmitted signal may be received by the active leakage cancellation circuit in front of the PA.

In some embodiments, the transmitter may include a power amplifier (PA). The portion of the transmitted signal may be received by the active leakage cancellation circuit behind the PA.

In some embodiments, the receiver may include a low noise amplifier (LNA). The adjusted portion of the first signal may be received by the receiver in front of the LNA.

In some embodiments, the receiver may include an analog-to-digital converter (ADC). The MCU may be configured to measure a static leakage reading from the ADC.

In some embodiments, the active leakage cancellation circuit may include a variable attenuator and phase shifter configured to adjust gain and phase of the portion of the transmitted signal.

In some embodiments, the adjustment to gain and phase may be controlled by the MCU in response to a determination made by the MCU based on the static leakage reading.

In some embodiments, the adjustment to gain and phase may be synchronized with a frequency sweep of the signal.

In some embodiments, the active leakage cancellation circuit may include a vector modulator configured to adjust the in-phase and quadrature (I and Q) of the transmitted signal.

In some embodiments, the adjustment to I and Q may be controlled by the MCU in response to a determination made by the MCU based on the static leakage reading.

In some embodiments, the adjustment to I and Q may be synchronized with a frequency sweep of the signal.

A method is disclosed, in accordance with one or more embodiments of the disclosure. The method may include, but is not limited to, measuring a static leakage reading from a receiver of a low range altimeter (LRA) for leakage. The method may include, but is not limited to, receiving a portion of a transmitted signal from a transmitter of the LRA within an active leakage cancellation circuit. The active leakage cancellation circuit may be installed within the LRA. The method may include, but is not limited to, determining at least one of a gain and phase adjustment or an in-phase and quadrature (I and Q) adjustment to the portion of the transmitted signal via a microcontroller unit (MCU) of the LRA. The determination may be made by the MCU based on the measured static leakage reading. The method may include, but is not limited to, performing at least one of the gain and phase adjustment or the in-phase and quadrature (I and Q) adjustment on the portion of the transmitted signal. The method may include, but is not limited to, injecting the portion of the transmitted signal into the receiver of the LRA after the at least one of the gain and phase adjustment or the in-phase and quadrature (I and Q) adjustment is performed.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
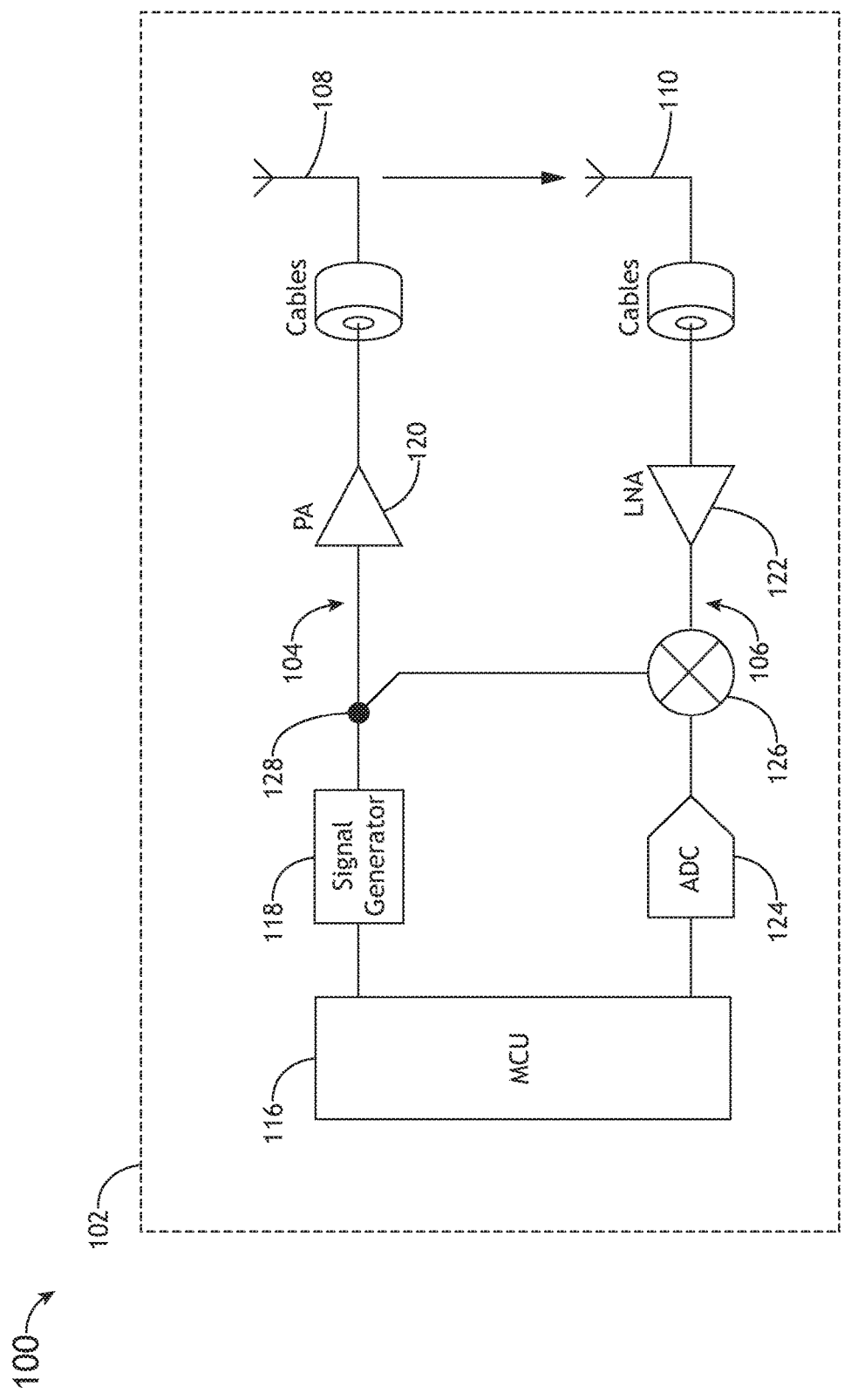
FIG. 1A illustrates a simplified block diagram of a portion of a non-integrated antenna assembly, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-5 in general illustrate a low range altimeter (LRA) with active leakage cancellation, in accordance with one or more embodiments of the disclosure.

Figure 1B:
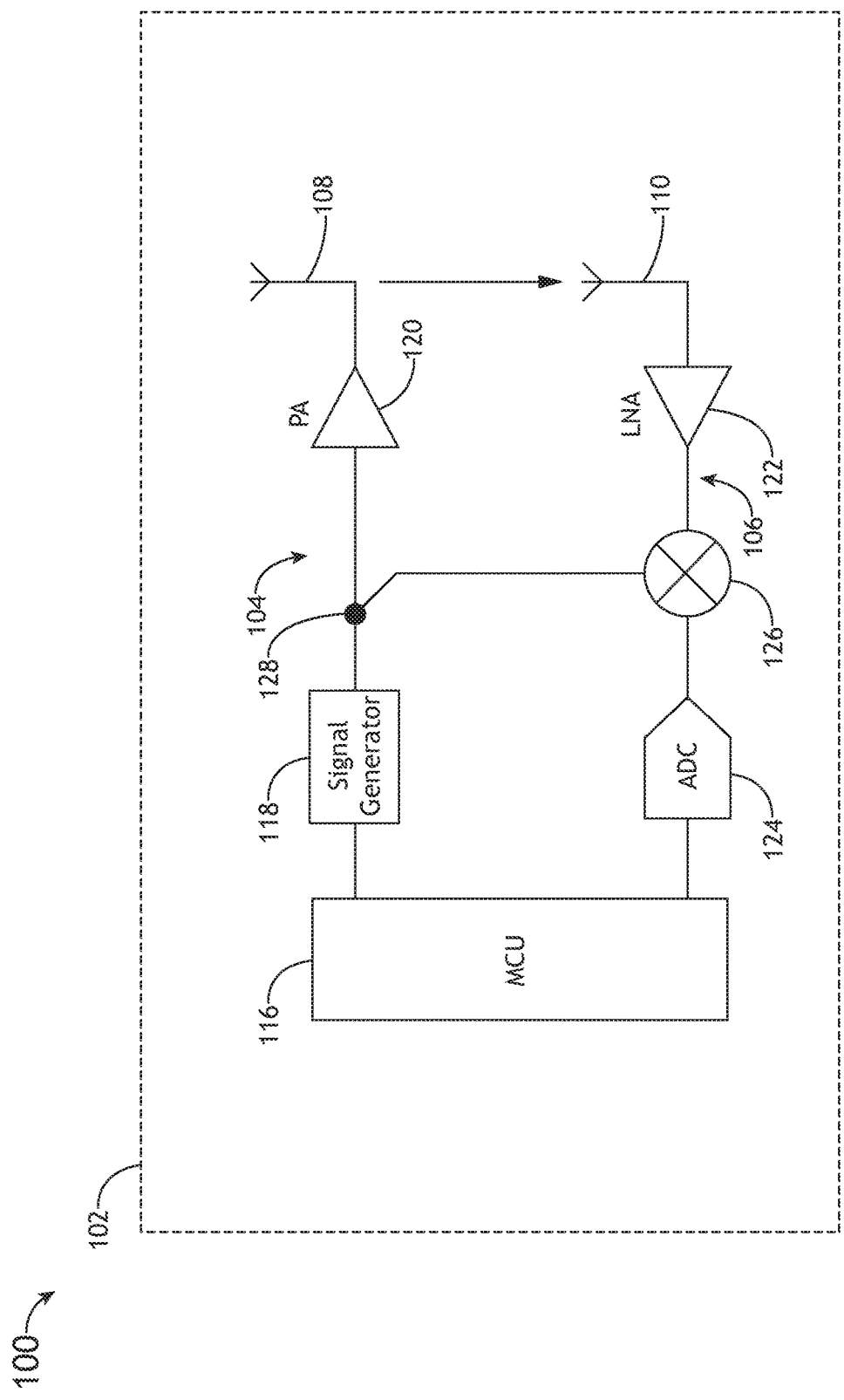
FIG. 1B illustrates a simplified block diagram of a portion of an integrated dual antenna assembly, in accordance with one or more embodiments of the disclosure.
Figure 1C:
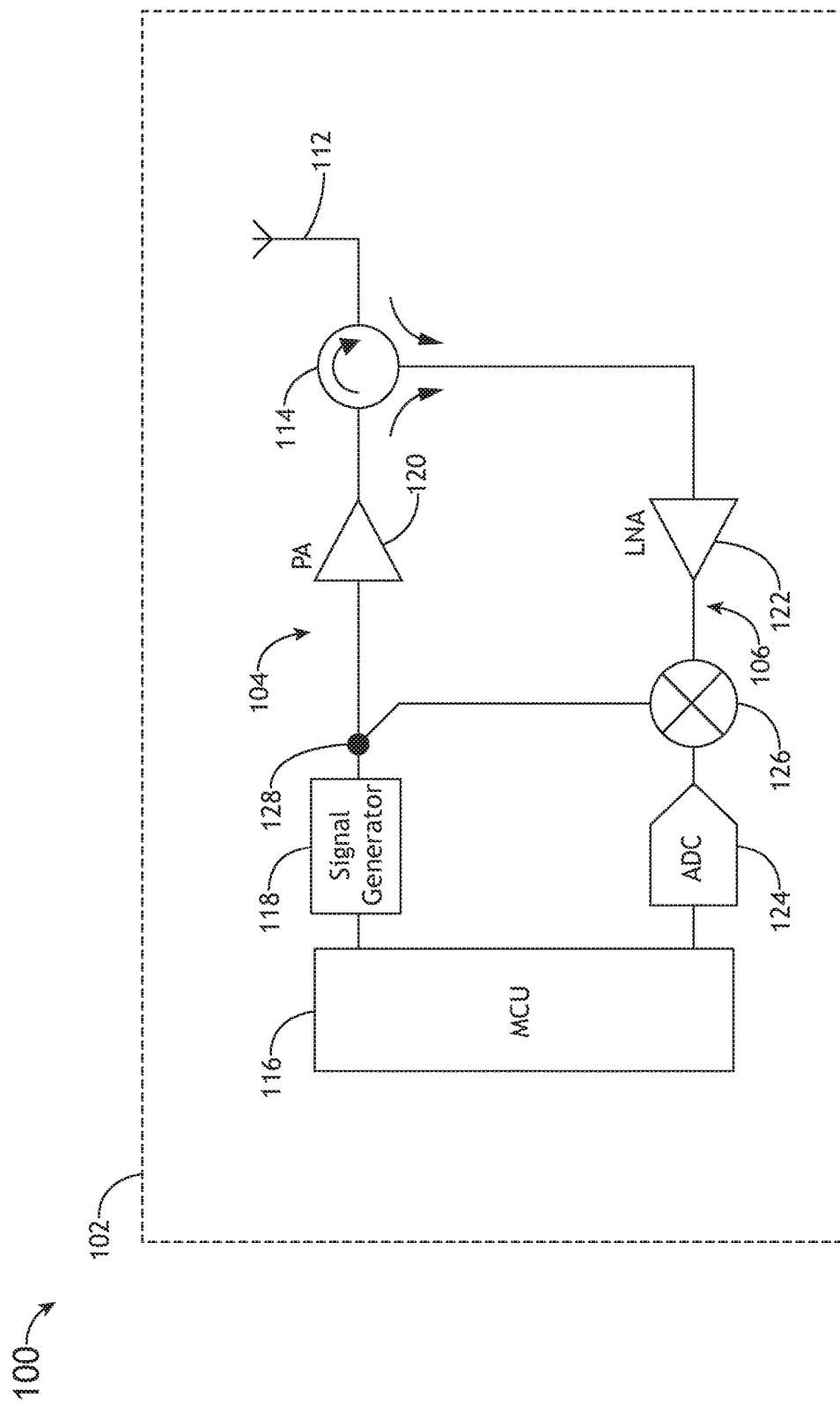
FIG. 1C illustrates a simplified block diagram of a portion of an integrated single antenna assembly, in accordance with one or more embodiments of the disclosure.

FIGS. 1A-1C in general illustrate portions of an antenna assembly 100, in accordance with one or more embodiments of the disclosure.

The antenna assembly 100 may be susceptible to leakage, which results in interference. Leakage may cause two issues, including a masking of low altitude returns and a masking of high altitude returns. For example, masking low altitude returns may cause spreading due to finite bandwidth. The masking of the low altitude returns may be addressed at least in part with post processing in software, being a static leakage term. By way of another example, masking high altitude returns may be caused by transmitter phase noise. The masking of the high altitude returns may not be cancelled with software.

As illustrated in FIG. 1A, the antenna assembly 100 may be non-integrated, including a low range unit 102 (e.g., a housing) with a transmitter 104 and a receiver 106. The transmitter 104 may include a TX antenna 108 and the receiver 106 may include an RX antenna 110 outside of the low range unit 102 that are physically separated to address the leakage through isolation. Having multiple antennas may be, in part, to meet guidelines and/or standards set forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

In one example, Frequency Modulated Continuous Wave (FMCW) radar altimeters may require high TX/RX isolation in order to prevent leakage paths from desensitizing the receiver due to finite transmitter phase noise and noise floor. For instance, TX/RX isolation in a Minimum Operational Performance Standards (MOPS) LRA installation may be at least 75 decibels (dB), which may be met by separating non-integrated antennas. The physical separation, however, may create siting issues for the antenna and corresponding components on an aircraft, where multiple antennas are required and/or installed. For example, a requirement of six antennas and an operation frequency of 4.3 GHz may require a number of large radio frequency (RF) feeder cables and siting locations for the antenna on the aircraft.

As illustrated in FIG. 1B, an antenna assembly 100 may be integrated, with the TX antenna 108 and the RX antenna 110 also housed within the low range unit 102 in addition to the transmitter 104 and the receiver 106. The TX antenna 108 and the RX antenna 110 may be physically separated to address the leakage through isolation. Because of the integrated nature of the antenna assembly 100, however, the ability to isolate may be limited due to proximity, with a minimum isolation reaching only approximately between 30 and 40 dB.

As illustrated in FIG. 1C, the antenna assembly 100 may be integrated, including an integrated single antenna 112, or combination transmitting and receiving (TX/RX) antenna 112, for both the transmitter 104 and the receiver 106. The antenna assembly 100 illustrated in FIG. 1C may include an RF circulator-based duplexer 114 between the transmitter 104 and the receiver 106. For example, the RF circulator-based duplexer 114 may allow for transmitting of a signal from the transmitter 104 through the TX/RX antenna 112 and/or allow for the receiving of the signal via the receiver 106 from the TX/RX antenna 112. The integrated single antenna 112 may require a different solution for the leakage, due to being unable to be physically separated.

Known integrated builds may not include antennas that are sufficiently physically separated to provide a necessary or desired level of isolation addressing the leakage, leading to issues caused by leakage being more severe in an integrated LRA due to the reduced physical separation. For example, reducing the system sensitivity through isolation of the TX/RX antenna 112 in an integrated LRA build may be infeasible or may provide unacceptable performance degradation due to TX phase noise, even assuming an FMCW source with very low phase noise proximity, with a minimum isolation reaching only approximately 10 dB.

Despite this, the antenna assembly 100 being integrated is still desirable to be competitive in a market. For example, the cost to manufacture and install may be greatly reduced. By way of another example, the integrated design may result in a smaller footprint allowing for installation on smaller aircraft, resulting in a safer aircraft and shared airspace. The integrating of the antenna assembly 100 with either an integrated dual antenna or an integrated single antenna would allow for all electronics related to the antenna assembly 100 to be mounted at a single location on an aircraft, including the removal of a number of radio frequency (RF) feeder cables and a number of other antenna from the antenna assembly 100, thus reducing cost, size, and need for multiple locations on the aircraft. The reduction of size and need for multiple locations on the aircraft may reduce installation issues on the aircraft (e.g., that might be present with dual or triple location installations).

As such, it would be desirable to provide a low range altimeter with active leakage cancellation. The antenna assembly 100 should include an active leakage cancellation circuit configured to inject an appropriate cancellation signal in the front of a receiver or receiver. A microcontroller unit (MCU) of the antenna assembly 100 should be configured to determine a gain and phase, and/or an in-phase and quadrature (I and Q), for the cancellation signal. The MCU of the antenna assembly 100 should be configured to adapt the cancellation signal at various points in the frequency sweep of the signal to reduce or cancel the leakage. The MCU of the antenna assembly 100 should be configured to synchronize the gain and phase adjustments with the frequency sweep of the signal. The MCU of the antenna assembly 100 should be configured to synchronize the I and Q adjustments with the frequency sweep of the signal. As such, the antenna assembly 100 should include both a hardware component and a software component configured to mitigate the masking of low altitude returns and the masking of high altitude returns due to the leakage.

Figure 2A:
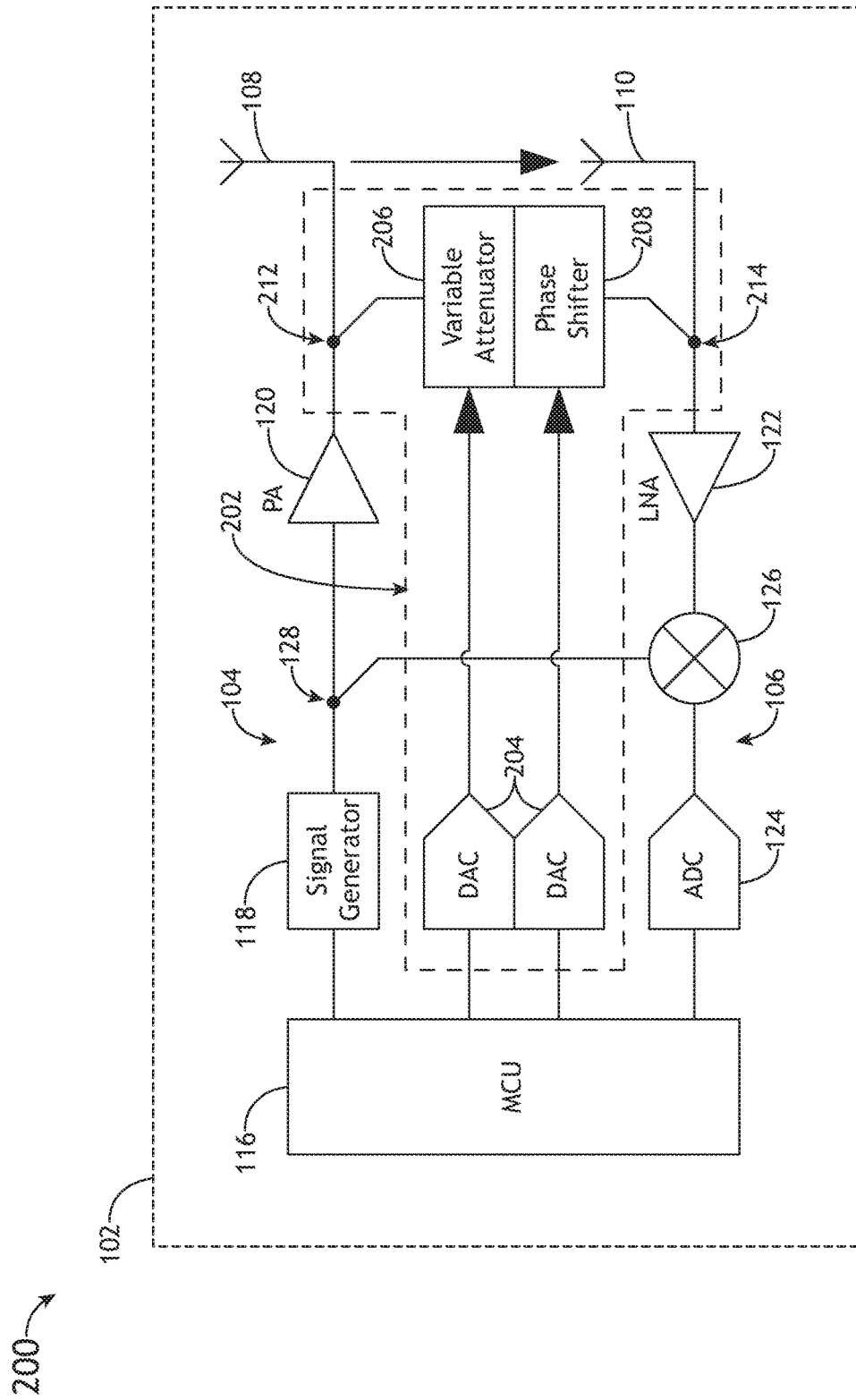
FIG. 2A illustrates a simplified block diagram of an integrated dual antenna LRA, in accordance with one or more embodiments of the disclosure.
Figure 2B:
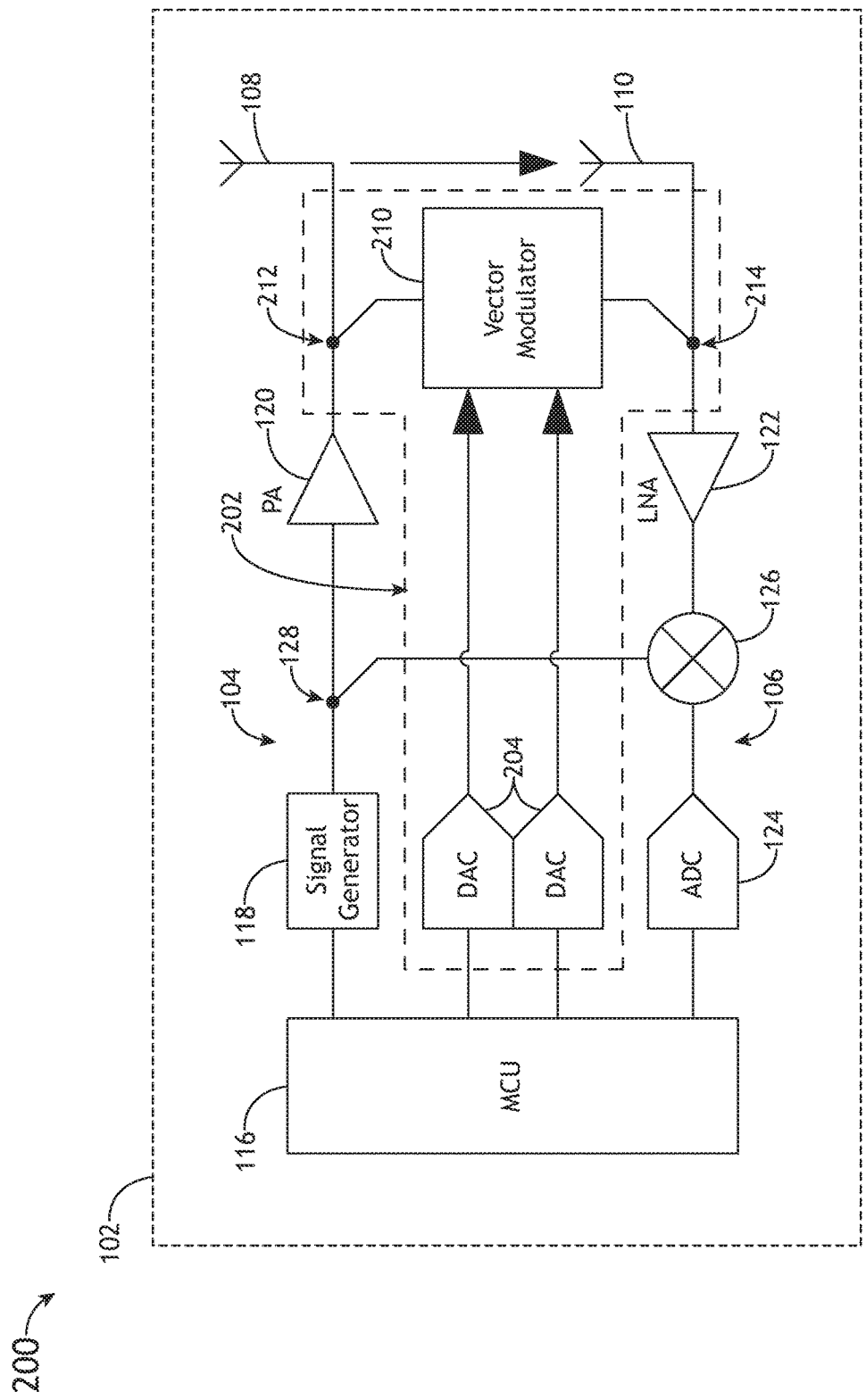
FIG. 2B illustrates a simplified block diagram of an integrated dual antenna LRA, in accordance with one or more embodiments of the disclosure.

FIGS. 2A-2D in general illustrate an integrated LRA 200 with an active leakage cancellation circuit 202, in accordance with one or more embodiments of the disclosure. In particular, FIG. 2A illustrates an integrated dual antenna LRA 200. In addition, FIG. 2B illustrates an integrated single antenna LRA 200. It is noted herein "active leakage cancellation circuit" and variants including, but not limited to, "active cancellation circuit," "cancellation circuit," or the like may be considered equivalent, for purposes of the disclosure.

In FIGS. 2A-2D, the integrated LRA 200 may include an MCU 116. The MCU 116 may be coupled to the transmitter 104 and configured to transmit information via the transmitter 104. The MCU 116 may be coupled to the receiver 106 and configured to receive information via the receiver 106.

The transmitter 104 may include a signal generator 118. For example, the signal generator 118 may produce an FMCW signal. By way of another example, the signal generator 118 may produce any spread spectrum signal. In general, the active cancellation circuit 202 may operate with any signal types and/or architecture known in the art.

The transmitter 104 may include a power amplifier (PA) 120. The signal generator 118 may be coupled to the PA 120. In one example, as illustrated in FIG. 2A, the PA 120 may be directly coupled to the TX antenna 108, such that the PA 120 supplies the TX antenna 108 with a modified or unmodified portion of the signal from the signal generator 118. In another example, as illustrated in FIG. 2B, the PA 120 may be coupled to the RF circulator-based duplexer 114, which may in turn be coupled to the TX/RX antenna 112, such that the RF circulator-based duplexer 114 supplies the TX antenna 108 with a modified or unmodified portion of the signal from the signal generator 118.

The receiver 106 may include a low-noise amplifier (LNA) 122. In one example, as illustrated in FIG. 2A, the RX antenna 110 may be directly coupled to the LNA 122. In another example, as illustrated in FIG. 2B, the TX/RX antenna 112 may be coupled to the RF circulator-based duplexer 114, which may in turn be coupled to the LNA 122.

The receiver 106 may include an intermediate frequency (IF) analog-to-digital converter (ADC) 124. The LNA 122 may be coupled to the ADC 124, such that the LNA 122 supplies the ADC 124 with a modified or unmodified portion of the signal from the RX antenna 108.

The receiver 106 and/or the transmitter 104 may include a frequency mixer 126. It is noted herein the frequency mixer 126 may be positioned at any location within the circuit(s) forming the receiver 106 and/or the transmitter 104.

The active cancellation circuit 202 may include a digital-to-analog converter (DAC) 204. For example, a first channel of the DAC 204 may be coupled to the MCU 116 and to a variable attenuator 206, and a second channel of the DAC 204 may be coupled to the MCU 116 and to a phase shifter 208. For instance, the variable attenuator 206 and the phase shifter 208 may be in series within the active cancellation circuit 202. By way of another example, the first and second channels of the DAC 204 may be coupled to the MCU 116 and the in-phase and quadrature (I and Q) inputs of a vector modulator 210, respectively. For example, the vector modulator 210 may include a quadrature modulator or other orthogonal modulator. It is noted herein the active cancellation circuit 202 may include either or both of the variable attenuator 206 and the phase shifter 208, and the vector modulator 210.

Referring now to FIGS. 2A and 2B, the integrated dual antenna LRA 200 may observe leakage between the TX antenna 108 and the RX antenna 110, instead of seeing only a (or any) reflection signal from the ground. In the integrated dual antenna LRA 200, the variable attenuator 206 and the phase shifter 208 (e.g., as illustrated in FIG. 2A) and/or the vector modulator 210 (e.g., as illustrated in FIG. 2B) may exit the transmitter 104 behind the PA 120 at a node or location 212, and may enter the receiver 106 in front of the LNA 122 at a node or location 214. In this regard, some amount of the transmitted signal may be fed directly from the transmitter 104 and to the receiver 106 to reduce or cancel the self-reading caused by leakage between the TX antenna 108 and the RX antenna 110.

Figure 2C:
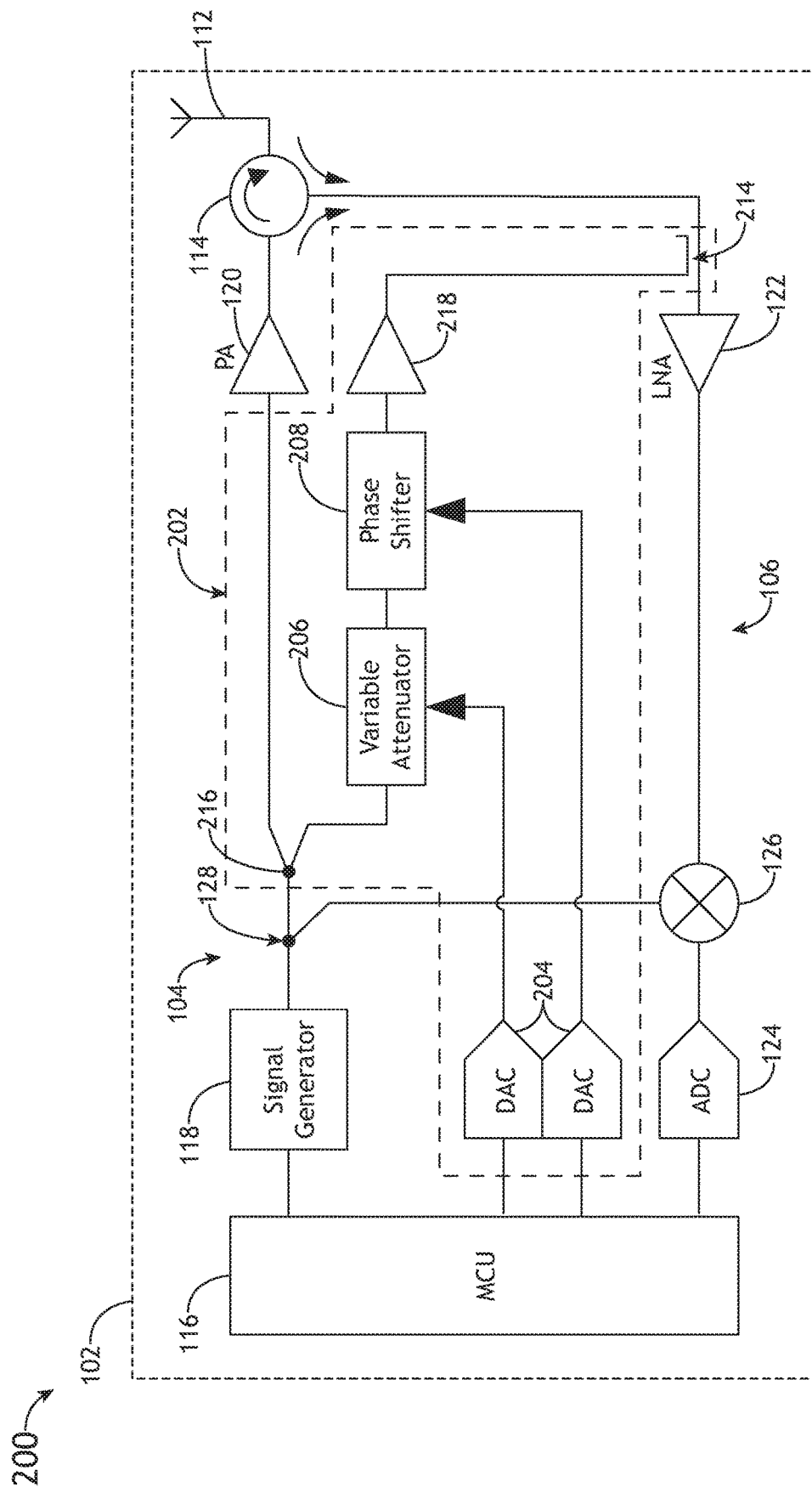
FIG. 2C illustrates a simplified block diagram of an integrated single antenna LRA, in accordance with one or more embodiments of the disclosure.
Figure 2D:
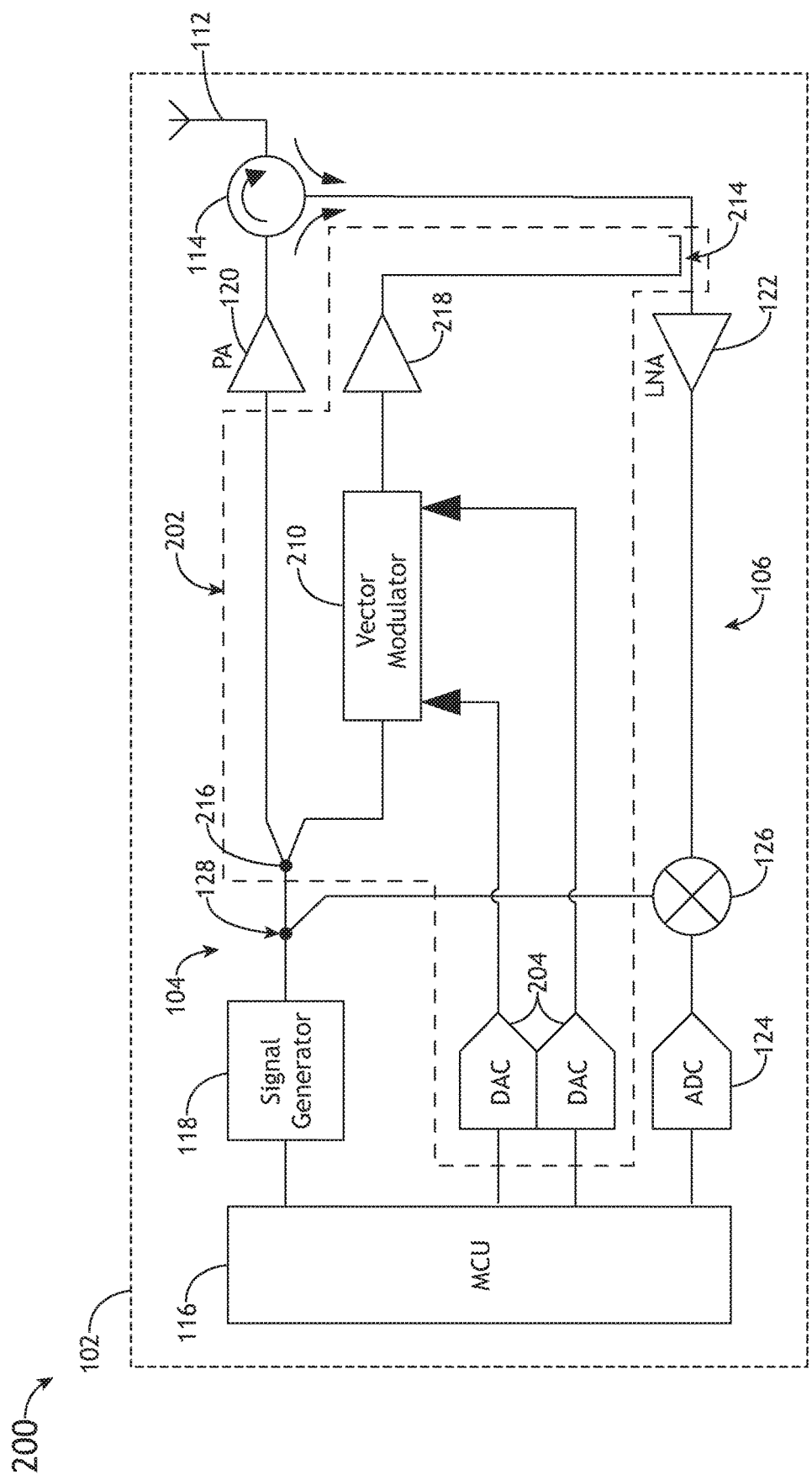
FIG. 2D illustrates a simplified block diagram of an integrated single antenna LRA, in accordance with one or more embodiments of the disclosure.

Referring now to FIGS. 2C and 2D, the integrated single antenna LRA 200 may have leakage passing from the transmitter 104, through the RF circulator-based duplexer 114, and directly into the receiver 106 in addition to the reflection signal from the ground received via the TX/RX antenna 112. In the integrated single antenna LRA 200, the variable attenuator 206 and the phase shifter 208 (e.g., as illustrated in FIG. 2C) and/or the vector modulator 210 (e.g., as illustrated in FIG. 2D) may exit the transmitter 104 in front of the PA 120 at a node or location 216 and enter the receiver 106 in front of the LNA 122 at the node or location 214.

Unlike the integrated dual antenna LRA 200, which may have a minimum isolation of approximately 40 dB, the integrated single antenna LRA 200 may have a minimum isolation of only approximately 10 dB, as the isolating element in the integrated LRA 200 is largely the RF circulator-based duplexer 114. Due to this, the leakage signal may be too strong to be reduced or cancelled by just the variable attenuator 206 and the phase shifter 208, and/or the vector modulator 210.

To increase the strength of the cancellation path through the active cancellation circuit 202, the active cancellation circuit 202 may include an additional amplifier 218 after the variable attenuator 206 and the phase shifter 208 and before the node or location 214. Although not shown, it is noted the additional amplifier 218 may be added to either the integrated single antenna LRA 200 or the integrated dual antenna LRA 200.

It is noted herein "coupled to" may mean one or more of "communicatively coupled to," "electrically coupled to," and/or "physically coupled to," for purposes of the present disclosure.

It is noted herein directions such as "behind" or "in front" may be understood to be relative to movement or flow of the signal within the transmitter 104 the receiver 106, and/or the active cancellation circuit 202.

Although embodiments of the disclosure illustrate the LRA 200 as including one or more integrated antennas, it is noted herein the active cancellation circuit 202 may be used with LRA 200 including non-integrated antennas (e.g., antennas outside the low range unit 102, as illustrated in FIG. 1A). Therefore, the above description should not be interpreted as a limitation on the present disclosure but merely an illustration.

Figure 3:
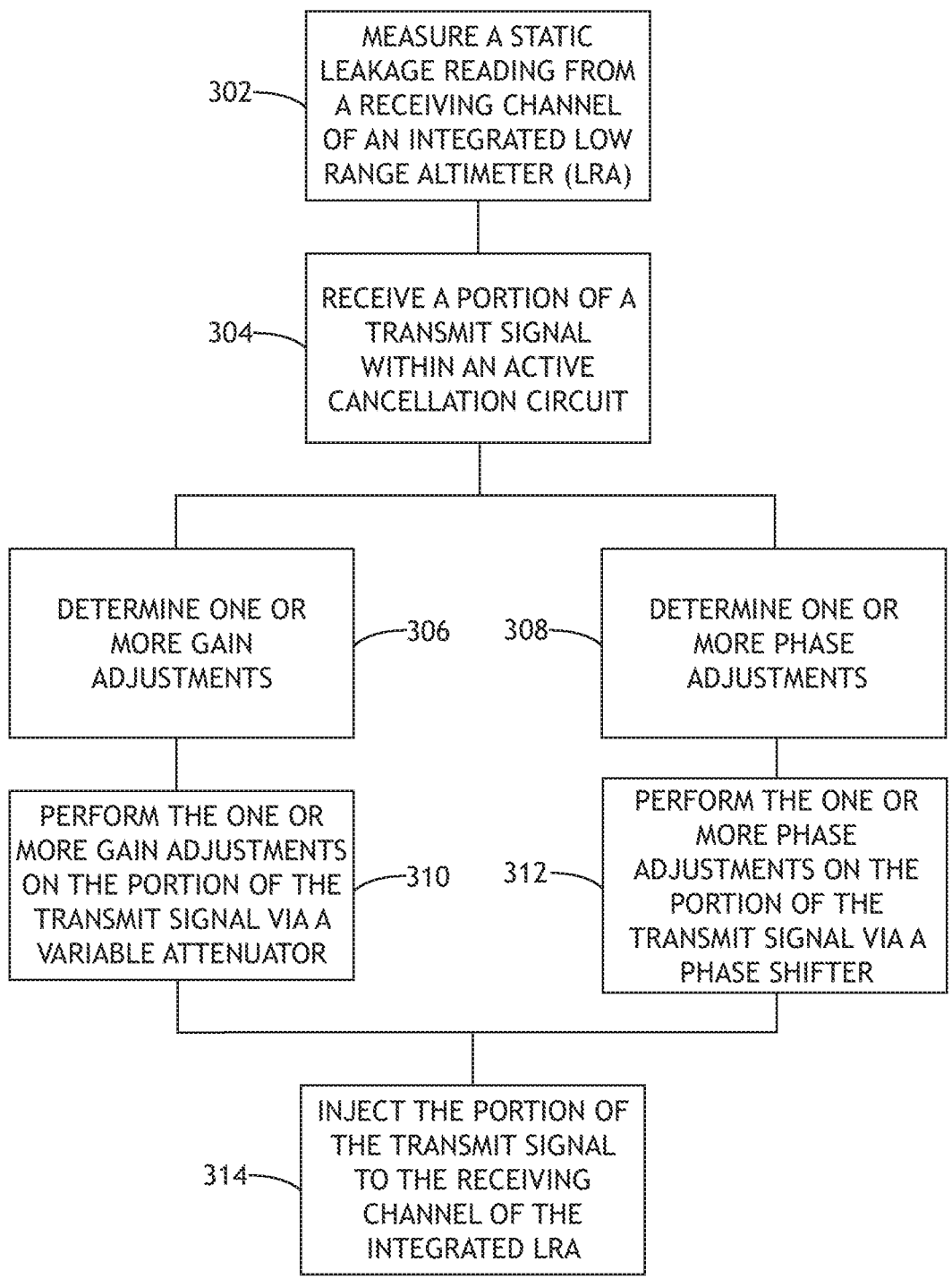
FIG. 3 illustrates a method or process for active leakage cancellation in an LRA, in accordance with one or more embodiments of the disclosure.
Figure 4:
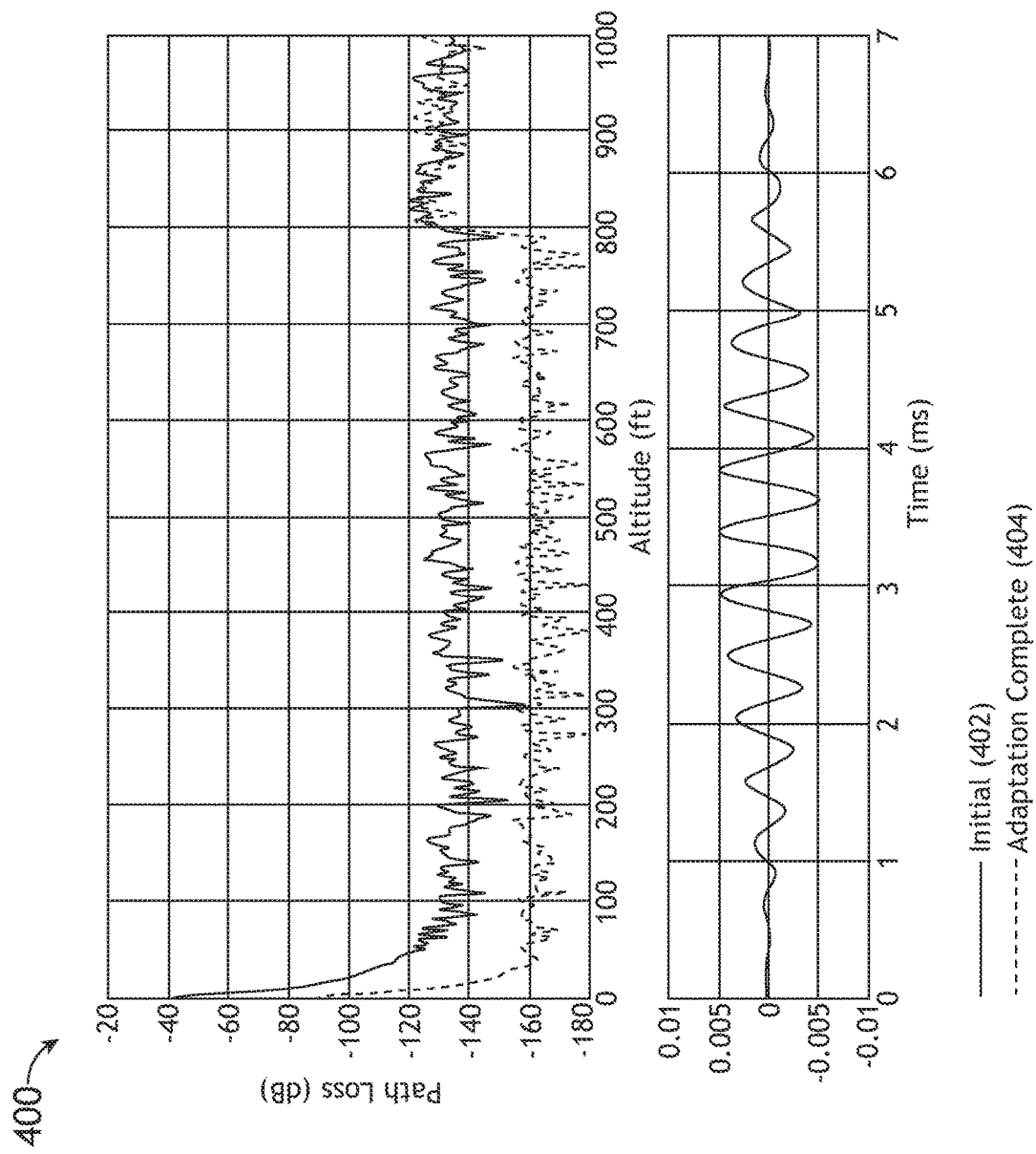
FIG. 4 a graph illustrating a comparison between a non-adapted signal and a resultant adapted signal adjusted with active leakage cancellation, in accordance with one or more embodiments of the disclosure.

FIG. 3 illustrates a method or process 300 for active cancellation of leakage in the integrated LRA 200, in accordance with one or more embodiments of the disclosure. FIG. 4 is a graph illustrating a comparison between a non-adapted signal and a resultant adapted signal adjusted with active leakage cancellation, in accordance with one or more embodiments of the disclosure.

In a step 302, a static leakage reading may be measured from a receiver of an integrated LRA. The static leakage reading may be an output of the ADC 124 (e.g., as measured by the MCU 116). Line 402 of the graph 400, as illustrated in FIG. 4, is an example representation of the output of the ADC 124 prior to the active cancellation of the leakage.

In a step 304, a portion of a transmit signal may be received by an active cancellation circuit. As illustrated in FIG. 2A, the portion of the transmitted signal from the transmitter 104 may be received behind the PA 120. As illustrated in FIG. 2B, the portion of the transmitted signal from the transmitter 104 may be received in front of the PA 120.

In a step 306, one or more gain adjustments are determined. In a step 308, one or more phase adjustments are determined. The algorithm may receive the static leakage reading taken from the ADC 124 and determine one or more settings for the variable attenuator 206 and/or the phase shifter 208 based on the static leakage reading. In addition, or in the alternative, the algorithm may receive the static leakage reading taken from the ADC 124 and determine one or more settings for the vector modulator 210 based on the static leakage reading. The determination of the gain adjustments and/or the phase adjustments may be performed via the MCU 116.

In a step 310, the one or more gain adjustments are performed on the portion of the transmitted signal via a variable attenuator. In a step 312, the one or more phase adjustments are performed on the portion of the signal via a phase shifter. The MCU 116 may adjust an output of the active cancellation circuit 202 via the variable attenuator 206 and/or the phase shifter 208. In addition, or in the alternative, the MCU 116 may adjust an output of the active cancellation circuit 202 via the vector modulator 210.

In a step 314, the adjusted portion of the transmitted signal is injected to the receiver of the integrated LRA. The MCU 116 may again measure the static leakage reading may be an output of the ADC 124 after the active cancellation of the leakage to confirm the cancellation and continue to monitor the receiver 106. Line 404 of the graph 400, as illustrated in FIG. 4, is an example representation of the output of the ADC 124 after the active cancellation of the leakage.

In this regard, the active cancellation of the leakage may occur during operation of the aircraft (e.g., on-the-fly). Although embodiments of the disclosure illustrate the use of the algorithm configured to constantly adjust the output of the active cancellation circuit 202 during operation of the aircraft, however, it is noted herein a look-up table may be employed at one or more stages of flight to assist in the leakage cancellation (e.g., as a starting point or calibration tool, or the like). However, a lookup table may require compensation for temperature to be determined, while the algorithm may not need the temperature compensation to adjust the reducing or cancelling the leakage signal. Therefore, the above description should not be interpreted as a limitation on the present disclosure but merely an illustration.

It is noted herein the method or process 300 is not limited to the steps and/or sub-steps provided. The method or process 300 may include more or fewer steps and/or sub-steps. In addition, the method or process 300 may perform the steps and/or sub-steps simultaneously. Further, the method or process 300 may perform the steps and/or sub-steps sequentially, including in the order provided or an order other than provided. Therefore, the above description should not be interpreted as a limitation on the scope of the disclosure but merely an illustration.

Figure 5:
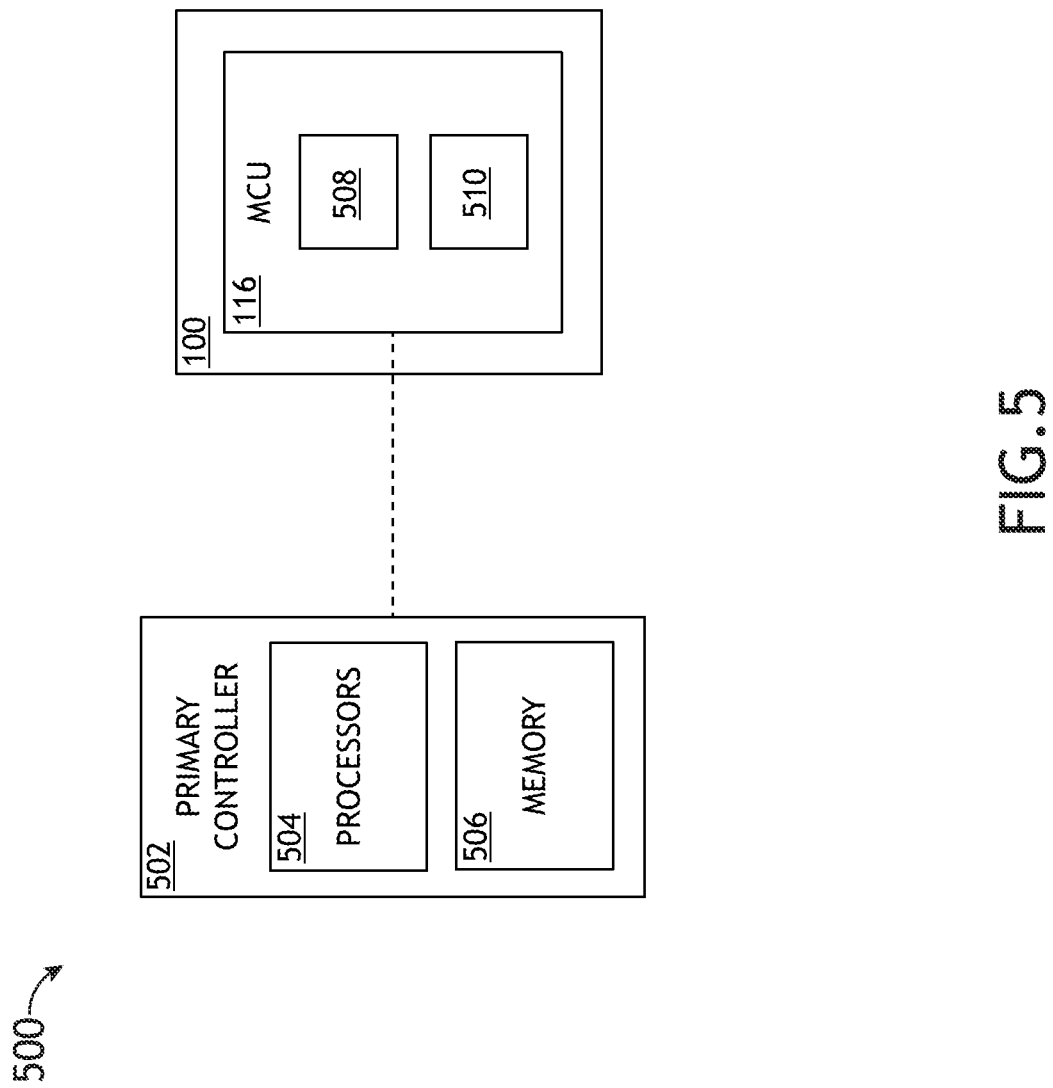
FIG. 5 illustrates a simplified block diagram of an aircraft including an LRA, in accordance with one or more embodiments of the disclosure.

FIG. 5 illustrates an aircraft 500 including the integrated LRA 200, in accordance with one or more embodiments of the disclosure.

Where the MCU 116 is installed within the integrated LRA 200, the MCU 116 may be coupled to a separate primary controller 502 installed within the aircraft 500.

Although embodiments of the disclosure illustrate the MCU 116 as being a component within the integrated LRA 200, however, it is noted herein the functions and operations performed by the MCU 116 may be performed by the primary controller 502 within the aircraft 500. In this regard, the MCU 116 may not be necessary within the integrated LRA 200, and any embodiment directed to operations or functions by the MCU 116 may be also directed to the primary controller 502.

The primary controller 502 may include one or more processors 504 configured to execute program instructions maintained on memory medium 506. The MCU 116 may include one or more processors 508 configured to execute program instructions maintained on memory medium 510. In this regard, the one or more processors 504, 508 of the primary controller 502 or the MCU 116, respectively, may execute any of the various process steps described throughout the present disclosure.

The one or more processors 504, 508 of a primary controller 502 or the MCU 116, respectively may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 504, 508 may include any device configured to execute algorithms and/or instructions (e.g., program instructions stored in memory). In one embodiment, the one or more processors 504, 508 may be embodied as a desktop computer, mainframe computer system, workstation, image computer, parallel processor, networked computer, or any other computer system configured to execute a program configured to operate or operate in conjunction with the integrated LRA 200, as described throughout the present disclosure.

Moreover, different subsystems of the aircraft 500, such as the integrated LRA 200 itself including the MCU 116 or other components of the integrated LRA 200, may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single primary controller 502 or the MCU 116, respectively or, alternatively, multiple controllers. In addition, the primary controller 502 or the MCU 116, respectively may include one or more controllers housed in a common housing or within multiple housings. In this way, any controller or combination of controllers may be separately packaged as a module suitable for integration into the defect detection system. Further, the primary controller 502 or the MCU 116, respectively may analyze a signal received from the detector and feed the signal to additional components within the integrated LRA 200 or external to the integrated LRA 200.

The memory medium 506, 510 may include any storage medium known in the art suitable for storing program instructions executable by the associated one or more processors 504, 508. For example, the memory medium 506, 510 may include a non-transitory memory medium. By way of another example, the memory medium 506, 510 may include, but is not limited to, a read-only memory (ROM), a random-access memory (RAM), a magnetic or optical memory device (e.g., disk), a magnetic tape, a solid-state drive and the like. It is further noted that memory medium 506, 510 may be housed in a common controller housing with the one or more processors 504, 508. In one embodiment, the memory medium 506, 510 may be located remotely with respect to the physical location of the one or more processors 504, 508 and primary controller 502 or the MCU 116, respectively. For instance, the one or more processors 504, 508 of primary controller 502 or the MCU 116, respectively may access a remote memory (e.g., server), accessible through a network (e.g., internet, intranet and the like).

In one embodiment, a user interface is communicatively coupled to the primary controller 502 or the MCU 116, respectively. In one embodiment, the user interface may include, but is not limited to, one or more desktops, laptops, tablets, and the like. In another embodiment, the user interface includes a display used to display data of the system 500 to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In another embodiment, a user may input selections and/or instructions responsive to data displayed to the user via a user input device of the user interface.

Although embodiments of the disclosure are directed to the variable attenuator 206 and the phase shifter 208, and/or the vector modulator 210, being coupled to the MCU 116 and controlled by the MCU 116 to make gain and phase adjustments within the active cancellation circuit 202, it is noted herein the variable attenuator 206 and the phase shifter 208, and/or the vector modulator 210, may be manually adjustable by a user via a user input device (e.g., a toggle, switch, knob, or other user input device). For example, the user interface may display an adjustment to gain or phase determined based on the static leakage reading from the ADC 124, and the user may interact with the user input device to make the appropriate adjustments within the active cancellation circuit 202.

In another embodiment, the primary controller 502 or the MCU 116, respectively is communicatively coupled to one or more elements of the integrated LRA 200. In this regard, the primary controller 502 or the MCU 116, respectively may transmit and/or receive data from any component of the integrated LRA 200. Further, the primary controller 502 or the MCU 116, respectively may direct or otherwise control any component of the integrated LRA 200.

For example, the primary controller 502 or the MCU 116, respectively may be programmed to execute an algorithm configured to constantly take a static leakage reading from the ADC 124, determine gain adjustments and/or phase adjustments to reduce or cancel leakage observed in the static leakage reading, and adjust an output of the active cancellation circuit 202 via the variable attenuator 206 and/or the phase shifter 208, and/or via the vector modulator 210, based on the determined gain adjustments and/or phase adjustments during operation of the aircraft.

In this regard, the integrated LRA 200 includes the active leakage cancellation circuit 202 configured to inject an appropriate cancellation signal in the front of a receiver or receiver 106. The MCU 116 of the integrated LRA 200 is configured to determine a gain and phase for the cancellation signal. The MCU of the integrated LRA 200 is configured to adapt the cancellation signal at various points in the frequency sweep of the signal to reduce or cancel the leakage. The MCU of the integrated LRA 200 is configured to synchronize the gain and phase adjustments with the frequency sweep of the signal. As such, the integrated LRA 200 includes both a hardware component and a software component configured to mitigate the masking of low altitude returns and the masking of high altitude returns in the leakage.

Although embodiments of the disclosure illustrate the integrated LRA 200 being coupled to the aircraft 500, it is noted herein, however, that the integrated LRA 200 and/or components of the integrated LRA 200 are not limited to the aviation environment and/or the aircraft components within the aviation environment. For example, the integrated LRA 200 and/or components of the integrated LRA 200 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the integrated LRA 200 and/or components of the integrated LRA 200 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A low range altimeter (LRA), comprising:
    a transmitter including a signal generator, a first node, and a power amplifier, the signal generator configured to produce a frequency modulated continuous wave signal, the first node coupled between the signal generator and the power amplifier;
    a receiver including a low-noise amplifier, a mixer, and an analog-to-digital converter; the mixer coupled between the low-noise amplifier, the first node, and the analog-to-digital converter;
    at least one antenna, the transmitter configured to transmit a first signal via the at least one antenna, the receiver configured to receive a second signal via the at least one antenna, the first signal being a transmitted signal and the second signal being a received signal;
    an active leakage cancellation circuit including a digital-to-analog converter, a variable attenuator, a phase shifter, and an additional amplifier, the transmitter exiting to the variable attenuator of the active leakage cancellation circuit in front of the power amplifier by which the active leakage cancellation circuit is configured to receive a portion of the transmitted signal from the transmitter, the active leakage cancellation circuit configured to adjust a gain and a phase of the portion of the transmitted signal to generate a cancellation signal by the variable attenuator, the phase shifter, and the additional amplifier, the additional amplifier provided after the variable attenuator and the phase shifter, the active leakage cancellation circuit entering the receiver in front of the low noise amplifier by which the active leakage cancellation circuit is configured to inject the cancellation signal into the receiver to reduce leakage observed in the received signal; and
    a microcontroller unit (MCU), the MCU configured to:
        measure a static leakage reading from the analog-to-digital converter;
        determine one or more gain adjustments for the variable attenuator and one or more phase adjustments for the phase shifter based on the static leakage reading; and
        cause the variable attenuator to adjust the gain and cause the phase shifter to adjust the phase for generating the cancellation signal.

2. The LRA of claim 1, the at least one antenna including a transmitting (TX) antenna coupled to the transmitter, the at least one antenna including a receiving (RX) antenna coupled to the receiver, the leakage observed from the transmitting antenna by the receiving antenna.

3. The LRA of claim 1, the at least one antenna including a combination transmitting and receiving (TX/RX) antenna coupled to the transmitter and the receiver.

4. The LRA of claim 3, further comprising:
    a radio frequency (RF) circulator-based duplexer positioned between the transmitter, the receiver, and the combination TX/RX antenna, the leakage observed through the RF circulator-based duplexer in addition to the received signal.

5. The LRA of claim 1, the adjustment to gain and phase being synchronized with a frequency sweep of the signal.

6. The LRA of claim 1, the active leakage cancellation circuit comprising:
    a vector modulator configured to adjust the in-phase and quadrature (I and Q) of the transmitted signal.

7. The LRA of claim 6, the adjustment to I and Q being controlled by the MCU based on the static leakage reading.

8. The LRA of claim 6, the adjustment to I and Q being synchronized with a frequency sweep of the signal.

9. A low range altimeter (LRA), comprising:
    a transmitter including a signal generator, a first node, and a power amplifier, the signal generator configured to produce a frequency modulated continuous wave signal, the first node coupled between the signal generator and the power amplifier;
    a receiver including a low-noise amplifier, a mixer, and an analog-to-digital converter; the mixer coupled between the low-noise amplifier, the first node, and the analog-to-digital converter;
    at least one antenna, the transmitter configured to transmit a first signal via the at least one antenna, the receiver configured to receive a second signal via the at least one antenna, the first signal being a transmitted signal and the second signal being a received signal;
    an active leakage cancellation circuit including a digital-to-analog converter, a variable attenuator, and a phase shifter, the transmitter exiting to the variable attenuator of the active leakage cancellation circuit behind the power amplifier by which the active leakage cancellation circuit is configured to receive a portion of the transmitted signal from the transmitter, the active leakage cancellation circuit configured to adjust a gain and a phase of the portion of the transmitted signal to generate a cancellation signal by the variable attenuator and the phase shifter, the active leakage cancellation circuit entering to the receiver in front of the low noise amplifier by which the active leakage cancellation circuit is configured to inject the cancellation signal into the receiver to reduce leakage observed in the received signal; and a microcontroller unit (MCU), the MCU configured to:
- measure a static leakage reading from the analog-to-digital converter;
- determine one or more gain adjustments for the variable attenuator and one or more phase adjustments for the phase shifter based on the static leakage reading; and
- cause the variable attenuator to adjust the gain and cause the phase shifter to adjust the phase for generating the cancellation signal.

* * * * *